Aug. 26, 1969     R. E. HENDERSON     3,463,437
TRIPOD STABILIZER
Filed Aug. 17, 1967
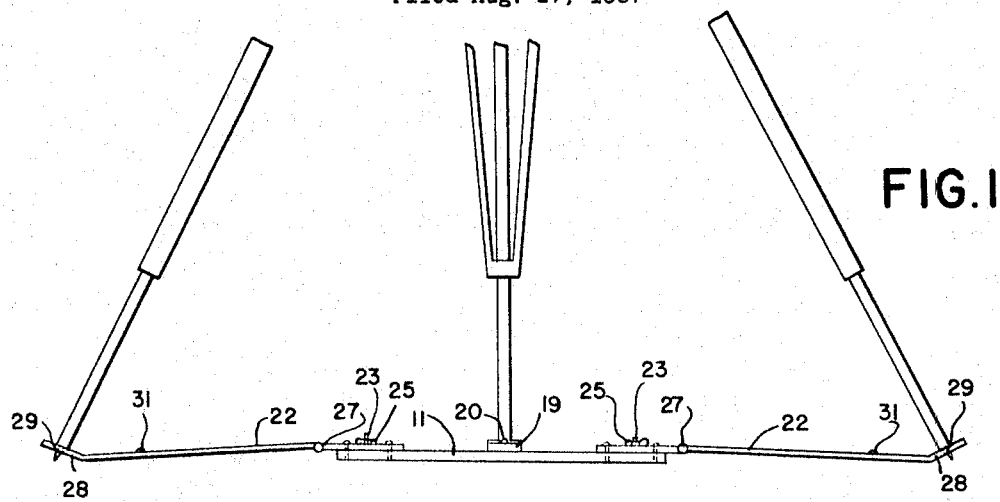
FIG.1
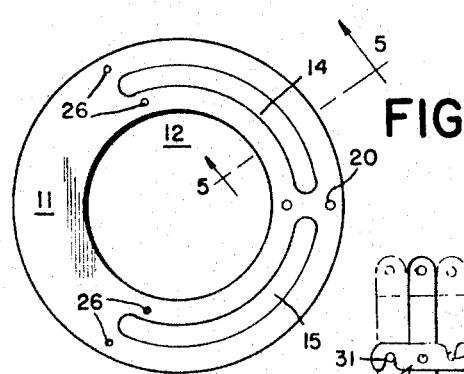
FIG.2
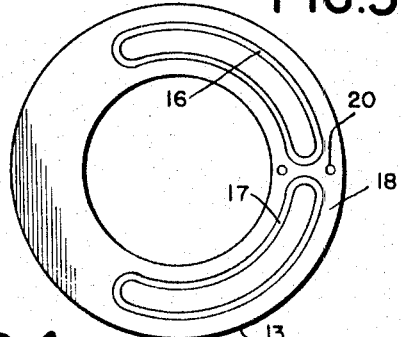
FIG.3
FIG.5
FIG.6
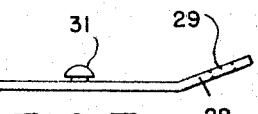
FIG.7
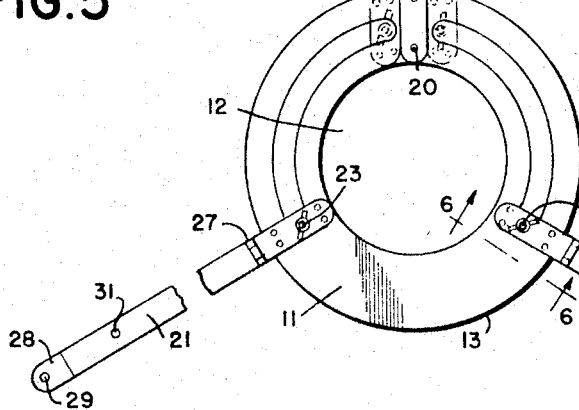
INVENTOR
REX E. HENDERSON
BY *Harvey S. Boyd*
ATTORNEY United States Patent Office 3,463,437
Patented Aug. 26, 1969

3,463,437
TRIPOD STABILIZER
Rex E. Henderson, 14310 Yosemite Court,
Rockville, Md. 20853
Filed Aug. 17, 1967, Ser. No. 661,478
Int. Cl. A47g 29/00; A47b 91/00
U.S. Cl. 248—346                 2 Claims

ABSTRACT OF THE DISCLOSURE

This invention relates to a collapsible apparatus designed to receive a standard tripod. The apparatus has one stationary leg and two movable legs, each leg being adapted to receive the foot of a standard tripod.

The invention described herein may be manufactured and used by or for the Government for governmental purposes without the payment to me of any royalty thereon.

Background of the invention

This invention relates to a generally horizontal support for a tripod. Tripods for surveying instruments are generally provided at the lower end of each leg with a pointed metal shoe or tip intended to dig into the earth. Sometimes the earth's surface is too hard to permit such digging in. It is also preferred not to dig into certain surfaces, such as the floors of classrooms in which the use of the instrument is being taught. Prior art devices have attempted to accommodate for this problem by making interchangeable or convertible tripod foot tips.

Summary of the invention

This invention provides a novel solution to the problem of providing a support structure for a tripod wherein said support structure provides a static structural base which enables the tripod to be utilized on any surface independent of the surface's texture or composition since the tripod relies upon the support structure for its rigidity and not the surface over which the tripod is placed. Accordingly, it is an object of this invention to provide a support for a standard tripod which will enable the tripod to be used on hard surfaces without alteration of the tripod itself and without damaging the surface on which it is used. It is a further object of this invention to provide a support for a tripod which will stabilize the position of a tripod.

It is still a further object of this invention to provide a tripod support which is collapsible and easily transportable.

Brief description of the drawings

FIG. 1 is a schematic view of the invention in use;

FIG. 2 is a top plan view of an annulus constituting a principal part of the invention;

FIG. 3 is a bottom plan view of the same;

FIG. 4 is a top plan view of the apparatus in operation position;

FIG. 5 is a section on the line 5—5 of FIG. 2;

FIG. 6 is a fragmentary section along the line 6—6 of FIG. 4; and

FIG. 7 is a fragmentary elevation of the outer end of an arm of the apparatus.

Description of the preferred embodiment

Referring now in detail to the drawing, the stabilizer comprises the metal annulus 11 having the central circular hole 12, a concentric circumference 13, two arcuate concentric through slots 14, 15 and two wider slots 16, 17 concentric with and symmetrically disposed around slots 14, 15 formed in the bottom surface 18.

The arm 19 of unitary construction is firmly connected to annulus 11 by the rivets 20. The arms 21, 22 are slidably connected to annulus 11, each by its bolt 23 slidable in a slot 14 or 15 and having a head 23 slidable in slot 16 or 17. Wing nut 25 threaded on bolt 23 provides means for locking the arm 21 or 22 in any desired position.

The pins 26 firmly imbedded in annulus 11 and extending upwardly therefrom snugly engage corresponding holes in the arms 21, 22 to fix the latter at 120 degree intervals from arm 19 and from each other. Arms 21, 22 have hinges 27 near their inner ends so that the stabilizer may accommodate to any uneven surface.

The arms 19, 21, 22 have their outer end portions 28 upturned 20 degrees and formed with the through hole 29, as clearly shown in FIG. 7. Headed pins 31 are provided near the outer ends of arms 21, 22 and are engaged by the keeper 30, FIG. 4, when arms 21, 22 have been unlocked from the illustrated position and moved to be parallel to arm 19 in which position the stabilizer is in condition for storage.

In operation, the stabilizer is opened to the position illustrated in FIG. 4 and the pointed shoes or tips of the tripod are inserted in the holes 29. The annulus 11 will be centered over the monument mark by a plumb bob extending from the surveying instrument in known manner, the mark being visible through the hole 12. The engagement of the tripod shoes in holes 29 stabilizes the tripod as will be evident to those familiar with tripods.

I claim:
1. A generally horizontal support for a tripol comprising:
   (a) a central annulus having a hole in the center;
   (b) a plurality of pins protruding upward from said annulus;
   (c) a fixed leg rigidly connected to said annulus, the outer portion of said leg being inclined upward to an angle of approximately 20 degrees above the horizontal, said inclined portion having a hole to receive a leg of a tripod;
   (d) two legs slidably connected to said annulus, each of said slidable legs having a hole near its inner end receiving said pins protruding from said annulus, each of said slidable legs having two sections connected by a hinge near said annulus, the outer sections of each of said slidable legs having an outer portion inclined upward at an angle of approximately 20 degrees above horizontal said inclined portion of each of said slidable legs having a hole to receive a leg of a tripod;
   (e) a headed pin protruding from each of said slidable legs; and
   (f) a keeper having notches pivotally connected to said fixed legs to cooperate with said headed pins to lock all three legs together in a position generally parallel and adjacent.

2. A generally horizontal support comprising:
(a) an annulus;
(b) three legs connected to said annulus wherein one of said legs is rigidly affixed to said annulus and the other said legs being slidably connected to said annulus with each of said legs extending away from said annulus with the outer portion of each of said begs being inclined slightly above the horizontal and containing a hole therein;
(c) means for locking in place at variable angular relationships about the circumference of said annulus said legs which are slidably connected to said annulus;
(d) a keeper pivotally connected to said rigidly affixed leg, said keeper having two notches, one on each side near the opposite ends of said keeper; and
(e) a headed pin positioned on each of said slidably connected legs so that when all of said legs are in a parallel position, said headed pins cooperate with said notches on said keeper so as to lock said legs together.

References Cited
UNITED STATES PATENTS

| | | | |
|---|---|---|---|
| 1,364,867 | 1/1921 | Chandless | 248—44 |
| 2,023,340 | 12/1935 | Peskulich | 248—44 |
| 2,786,641 | 3/1957 | Applegate | 248—46 |
| 2,875,968 | 3/1959 | Ekola | 248—48 |

CHANCELLOR E. HARRIS, Primary Examiner

JOHN PETO, Assistant Examiner

U.S. Cl. X.R.

248—188.7